(12) United States Patent
Nagasaka et al.

(10) Patent No.: US 6,615,132 B1
(45) Date of Patent: Sep. 2, 2003

(54) NAVIGATION DEVICE

(75) Inventors: Chikao Nagasaka, Aichi (JP);
Yoshimasa Kunimatsu, Aichi (JP);
Masato Nishikawa, Aichi (JP);
Toshiyuki Isogai, Aichi (JP)

(73) Assignee: Kabushiki Kaisha Tokai-Rika-Denki-Seisakusho (JP)

( * ) Notice: Subject to any disclaimer, the term of this patent is extended or adjusted under 35 U.S.C. 154(b) by 0 days.

(21) Appl. No.: 09/857,703

(22) PCT Filed: Feb. 22, 2000

(86) PCT No.: PCT/JP00/00993
§ 371 (c)(1),
(2), (4) Date: Jun. 8, 2001

(87) PCT Pub. No.: WO00/54007
PCT Pub. Date: Sep. 14, 2000

(30) Foreign Application Priority Data

Mar. 8, 1999 (JP) .......................................... 11-060435

(51) Int. Cl.⁷ .............................................. G01C 21/00
(52) U.S. Cl. ..................... 701/200; 701/36; 340/932.2; 340/988
(58) Field of Search ......................... 701/36, 200, 213; 342/359; 340/825.49, 825.69, 10.1, 932.2, 988

(56) References Cited

U.S. PATENT DOCUMENTS

| | | |
|---|---|---|
| 4,754,255 A | 6/1988 | Sanders et al. |
| 5,555,172 A | 9/1996 | Potter |
| 5,854,593 A | 12/1998 | Dykema et al. |
| 5,917,405 A * | 6/1999 | Joao ............................ 701/36 |
| 5,990,828 A * | 11/1999 | King ........................... 342/359 |
| 6,154,150 A * | 11/2000 | Laubach ................... 340/932.2 |
| 6,218,962 B1 * | 4/2001 | Fiene ....................... 340/932.2 |
| 6,271,765 B1 * | 8/2001 | King et al. ............ 340/825.69 |

FOREIGN PATENT DOCUMENTS

| | | |
|---|---|---|
| EP | 0667 597 A2 | 8/1995 |
| JP | 8-218669 | 8/1996 |
| JP | 10-8861 | 1/1998 |
| JP | 10-285660 | 10/1998 |

OTHER PUBLICATIONS

Supplementary European Search Report, Mar. 14, 2002.

* cited by examiner

*Primary Examiner*—Gary Chin
(74) *Attorney, Agent, or Firm*—Nixon Peabody LLP; Thomas W. Cole

(57) ABSTRACT

An object of the present invention is to provide a navigation device that can automatically open/close an electric garage door by remote control without manual operation and that can prevent erroneous opening/closing of the electric garage door. A navigation device 10 can be connected to a wireless garage door opener transmitter 50. The navigation device 10 transmits an open signal to the wireless garage door opener transmitter 50 when a vehicle position calculated by a GPS receiver 24 and an orientation detected by a gyro sensor 40 are within a predetermined range that respectively includes a preset electric garage door open instruction position and orientation, and a vehicle speed detected by a vehicle speed sensor 38 is no greater than a predetermined value. Thus, erroneous opening of the electric garage door when the vehicle approaches the electric garage with an object other than entering the electric garage can be prevented.

18 Claims, 6 Drawing Sheets

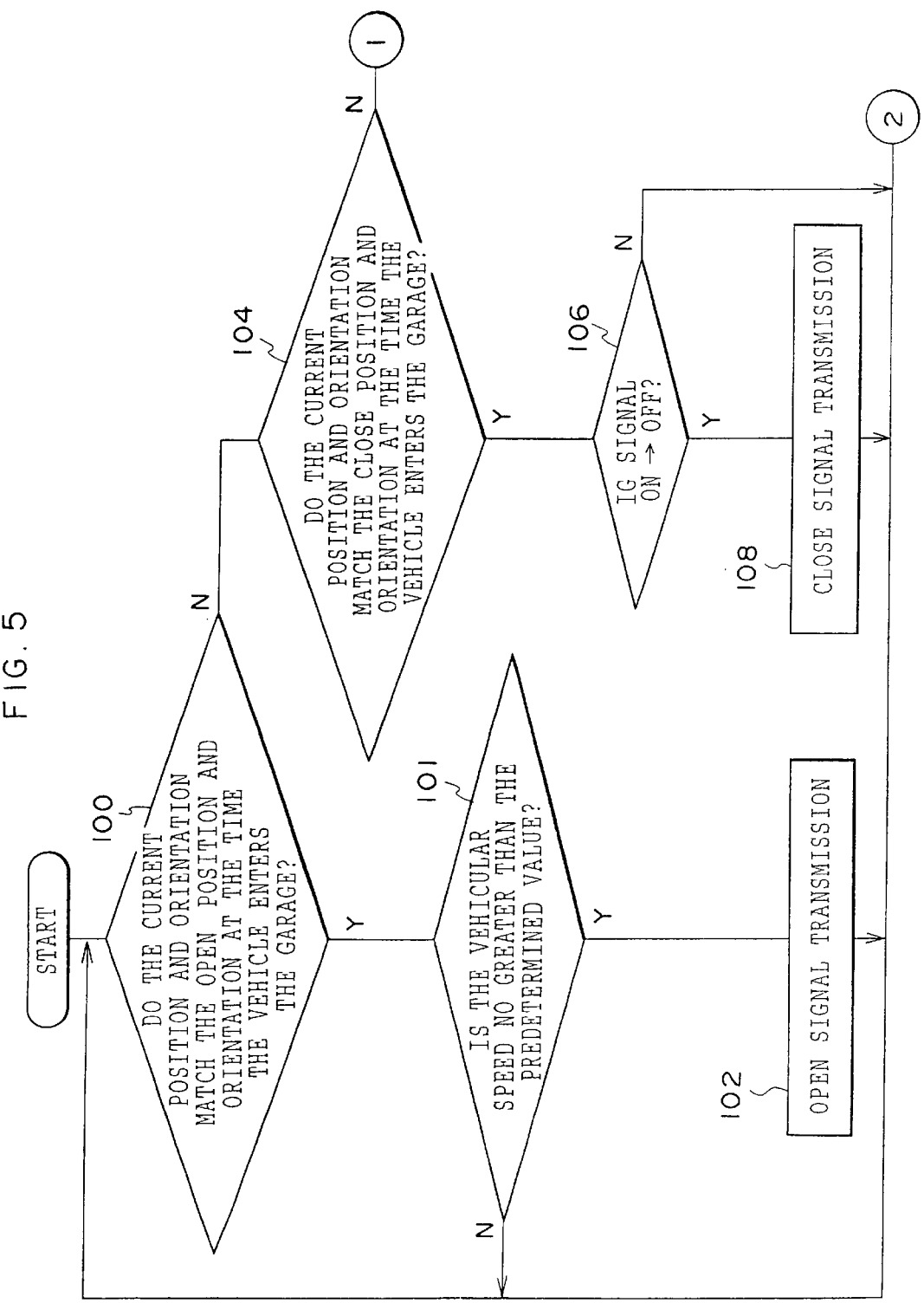

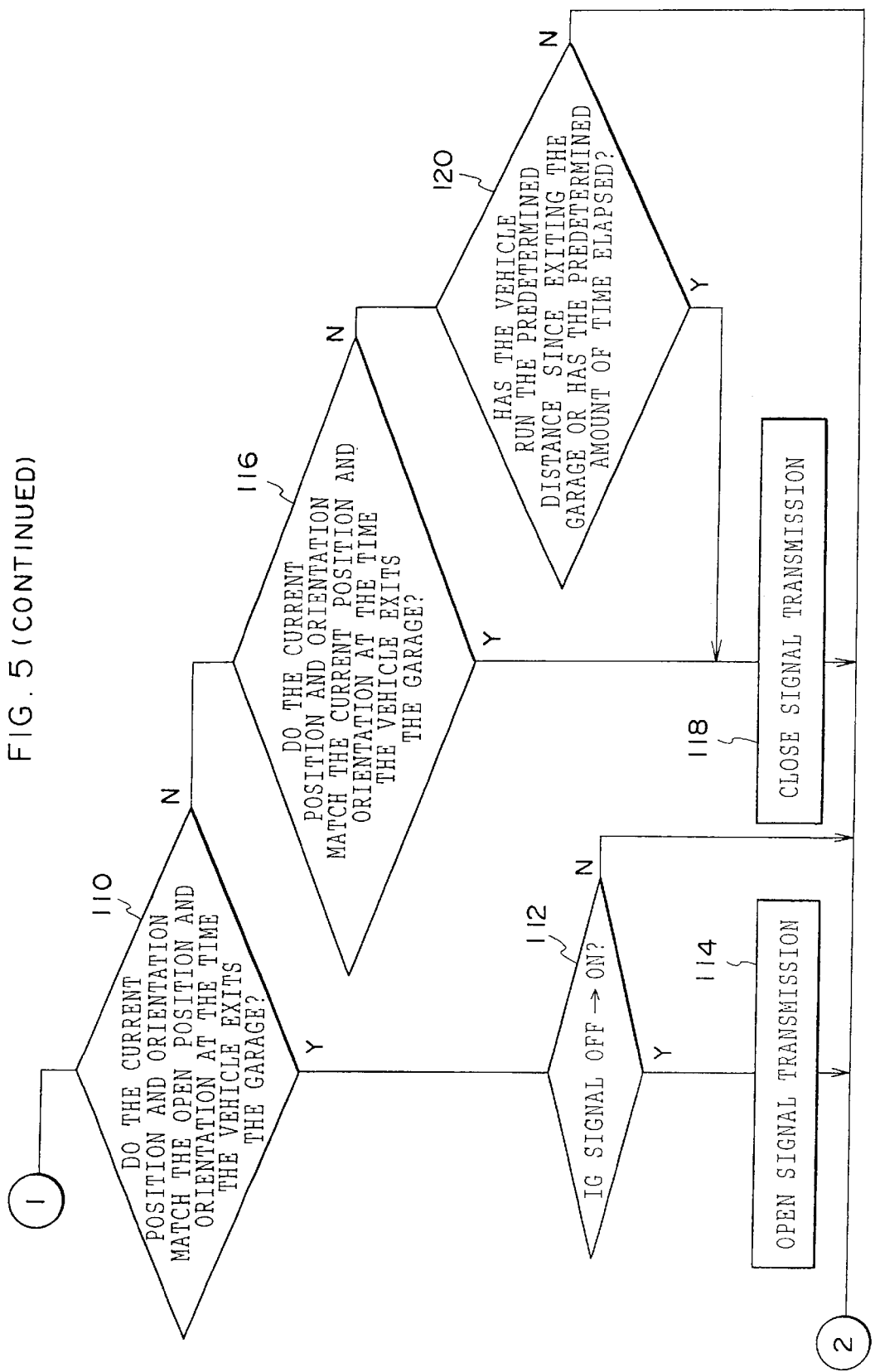

NAVIGATION DEVICE

TECHNICAL FIELD

The present invention relates to a navigation device, and particularly a navigation device to which an instrument for operating an electric garage or the like can be connected.

BACKGROUND ART

Conventionally, as garages for accommodating vehicles, there have been electric garages that can be opened/closed by operating a wireless remote control from the vehicle interior. However, when a radio wave is used as the signal transmitted from the wireless remote control, it can be thought that other electric garages within the range of the radio wave may be effected and erroneously operated.

In order to solve this problem, an electric garage has been proposed in which a light beacon having a predetermined vehicle ID stored therein is mounted in the garage, a signal including the vehicle ID is transmitted from the vehicle to the light beacon, and when the vehicle ID stored in the light beacon and the vehicle ID included in the received signal match, the garage door is opened automatically (Japanese Patent Application Laid-Open (JP-A) No. 10-8861).

However, in the aforementioned prior art, there has been the problem that, when the vehicle approaches the range in which the signal transmitted from the vehicle reaches the light beacon, erroneous opening/closing of the garage door is effected irrespective of the driver's volition.

Taking the above facts into consideration, an object of the present invention is to provide a navigation device that can automatically open/close an electric garage door without manual operation by remote control and that can prevent erroneous operation.

DISCLOSURE OF THE INVENTION

In order to accomplish the aforementioned object, a first aspect of the present invention is a navigation device to which a remote control device for remotely opening/closing an electric-garage door can be connected, the navigation device comprising: a current position detection means for detecting a current position of a vehicle; an orientation detection means for detecting a traveling direction of the vehicle; a speed detection means for detecting a speed of the vehicle; and an output means for outputting to the remote control device an open signal for opening the electric garage door when the current position and traveling direction respectively substantially match a predetermined open position and open orientation outside of the electric garage and the speed of the vehicle is no greater than a predetermined speed.

According to the first aspect of the present invention, in the navigation device to which the remote control device for remotely opening/closing the electric garage door can be connected, the current position detection means detects the current position of the vehicle. The current position of the vehicle can easily be detected by using a known GPS system to detect a position determined by longitude and latitude. The orientation detection means detects the traveling direction of the vehicle. With regard to the orientation direction means, vibratory gyro sensor can be used. The speed detection means detects the speed of the vehicle.

The output means outputs to the remote control device an open signal for opening the electric garage door when the current position of the vehicle detected by the current position detection means and the travelling direction of the vehicle detected by the orientation detection means respectively substantially match a predetermined open position and open orientation outside of the electric garage and the speed of the vehicle is no greater than a predetermined speed.

The open position and open orientation can be, for example, an optional position and orientation in the vicinity of the electric garage. The predetermined speed is set to no greater than the speed in an almost-stopped state. That is, when the vehicle approaches the electric garage, the electric garage door is automatically opened when the vehicle is about to or has stopped. In this manner, it is determined whether not only the current position of the vehicle but also the travelling direction substantially match. Further, it is judged whether or not the vehicle has substantially stopped or stopped, and an open signal for opening the electric garage door is outputted. Thus, erroneous opening of the electric garage door when the vehicle has merely passed in front of the electric garage or the like, or when the vehicle approaches the electric garage with a purpose other than entering the electric garage, can be prevented.

A second aspect of the present invention is the navigation device according to the first aspect, wherein the output means outputs to the remote control device a close signal for closing the electric garage door when the current position and the traveling direction respectively substantially match a predetermined position and predetermined orientation inside the electric garage and an engine of the vehicle has moved from an operating state to a stopped state.

According to the second aspect of the present invention, the output means outputs to the remote control device a close signal for closing the electric garage door when the current position and the traveling direction of the vehicle respectively substantially match a predetermined position and predetermined orientation inside the electric garage and the engine of the vehicle has stopped. Thus, the electric garage door can be automatically closed after the electric garage door is opened and the vehicle has entered the electric garage.

A third aspect of the present invention is the navigation device according to the first aspect or the second aspect, wherein the output means outputs to the remote control device an open signal for opening the electric garage door when an engine of the vehicle has started in a state in which the current position and traveling direction respectively substantially match a predetermined position and predetermined orientation inside the electric garage.

According to the third aspect of the present invention, the output means outputs to the remote control device an open signal for opening the electric garage door when the engine of the vehicle has started in a state in which the current position and traveling direction of the vehicle respectively substantially match a predetermined position and predetermined orientation inside the electric garage. Thus, the electric garage door can be automatically opened when the engine has been started from a state in which the vehicle has been parked in the electric garage. Consequently, the electric garage door can be automatically opened when the vehicle exits the electric garage.

A fourth aspect of the present invention is the navigation device according to the first aspect through the third aspect, wherein the output means outputs to the remote control device a close signal for closing the electric garage door when the current position and traveling direction respectively substantially match a predetermined close position and close orientation outside of the electric garage.

According to the fourth aspect of the present invention, the output means outputs to the remote control device a close signal for closing the electric garage door when the current position and traveling direction of the vehicle respectively substantially match a predetermined close position and close orientation outside of the electric garage. Thus, the electric garage door is automatically closed when the vehicle has exited the electric garage.

A fifth aspect of the present invention is the navigation device according to the first aspect through the fourth aspect, wherein the output means outputs to the remote control device a close signal for closing the electric garage door when the vehicle has run a predetermined distance from a predetermined position inside the electric garage or when a predetermined amount of time has elapsed after the electric garage door has been opened.

According to the fifth aspect of the present invention, the output means outputs to the remote control device a close signal for closing the electric garage door when the vehicle has run a predetermined distance from a predetermined position inside the electric garage or when a predetermined amount of time has elapsed after the electric garage door has been opened. Thus, the electric garage door is reliably and automatically closed even when the current position and traveling direction of the vehicle do not respectively substantially match the predetermined close position and close orientation outside of the garage when the vehicle has exited the electric garage.

BRIEF DESCRIPTION OF THE DRAWINGS

FIG. 5 is a flow chart illustrating a control flow executed by a CPU 12.

BEST MODE FOR CARRYING OUT THE INVENTION

A mode for carrying out the present invention will hereinafter be described in detail with reference to drawings.

Figure 1:
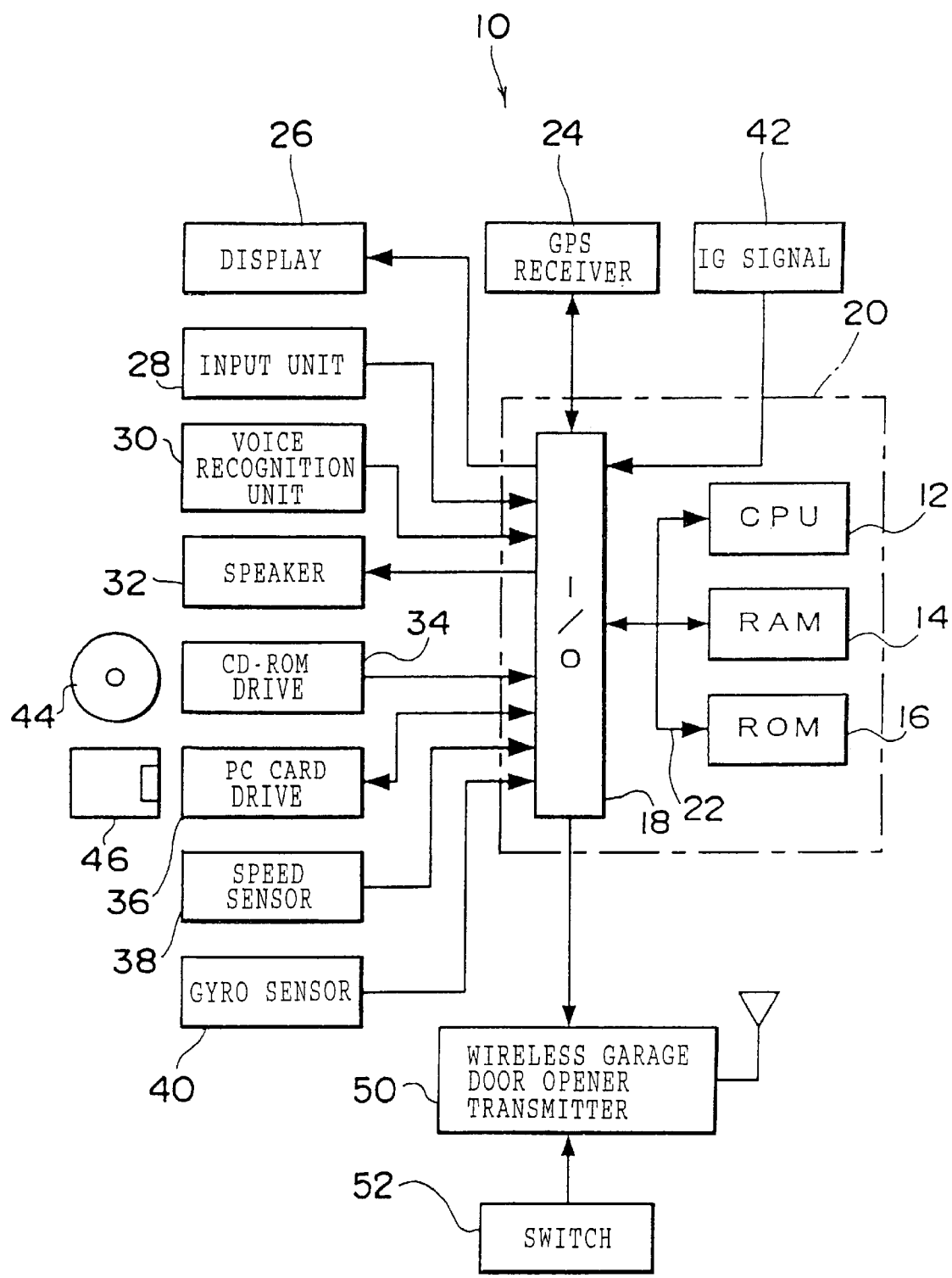
FIG. 1 is a block diagram illustrating a schematic structure of a navigation device pertaining to an embodiment of the present invention.

In FIG. 1, a schematic structure of a navigation device 10 pertaining to the present embodiment is illustrated.

The navigation device 10 is provided with a microcomputer 20 that is structured by a CPU 12, a RAM 14, a ROM 16 and an input/output (I/O) port 18, which are respectively connected by a bus 22 so that commands and data can be received. A control routine described later is a stored in the ROM 16.

To the input/output port 18, a GPS receiver 24, a display 26, an input unit 28, a voice recognition unit 30, a speaker 32 and a gyro sensor 40 are connected. Further, an IG (ignition) signal 42 that indicates whether or not an engine has started is inputted to the navigation device 10.

The GPS receiver 24 receives GPS signals from a plurality of GPS satellites positioned at an altitude of roughly 20,000 km in space, and calculates vehicular position. It should be noted that a DGPS (Differential GPS) receiver may be connected to receive corrected information for correcting differences in the GPS signals. Accordingly, vehicular position can be specified with great precision.

The display 26 is a display structured by liquid crystal and a CRT. The display 26 is capable of displaying, on a map image, marks that indicate vehicular position calculated by the GPS receiver 24.

The input unit 28 carries out navigational operations such as input of destination, search and registration of specific points, and summoning of map images. Examples of the input unit 28 include a wireless remote control, a wired remote control and touch panel.

Navigational operation can be conducted by voice through a voice recognition unit 30. At the voice recognition unit 30, voice recognition of an unspecified speaker is possible, a standard voice pattern of a command for operating navigation is pre-registered, a voice pattern obtained by extracting characteristics from an inputted voice signal is compared (pattern matching) with the standard voice pattern, and the voice pattern having the greatest resemblance to the standard voice pattern is determined as the command.

It should be noted that it is also possible to conduct voice recognition on a specified speaker and not just on an unspecified speaker. In this case, the command generated by a specified speaker is recorded and registered. An inputted voice is compared with the registered voice pattern, and the voice pattern having the greatest resemblance to the standard voice pattern is determined as the command.

The speaker 32 provides voice information with respect to the driver. For example, when a route to a destination is set, the voice information is route-guiding information that indicates directions to turn at intersections and the like, and recognition results and the like when a sound uttered by the driver is recognized by the voice recognition unit 30.

The CD-ROM drive 34 reads various data such as map information recorded on the CD-ROM 44. The map information recorded on the CD-ROM 44 includes information such as road data (e.g., general roads, highways and other road types), intersections and the like, place names and phone numbers.

It should be noted that, in place of storing the control program in the ROM 16, the control program can also be stored on the CD-ROM 44. Further, a recording medium such as a DVD-ROM can be used in place of the CD-ROM 44. In this case, a DVD-ROM drive can be used in place of the CD-ROM drive 34.

The PC card drive 36 reads information stored on the PC card 46 and reads information to the PC card 46. Various data such as point registration data and the like can be stored on the PC card 46.

It should be noted that, in place of storing the control program in the ROM 16, the control program can also be stored on the PC card 46. Further, a recording medium such as an MD, an MO, floppy disc or the like can be used in place of the PC card 46. In this case, an MD drive, an MO drive or a floppy disc drive can be used in place of the PC card drive 36.

A vehicle speed sensor 38 outputs pulse signals of a predetermined frequency in accompaniment with the revolution of the vehicle's wheels. The number of pulses to be output corresponding to one rotation of the wheels is predetermined. The speed and the running distance of the vehicle can be calculated by counting the number of pulses.

The gyro sensor 40 detects angular velocity of the vehicle when the vehicle changes direction, and outputs the angular velocity data and orientation data. The gyro sensor 40 may be, for example, a vibrating gyro structured by piezoelectric elements or the like.

Further, the navigation device 10 can be connected to a wireless garage door opener transmitter 50. The wireless garage door opener transmitter 50 has, for example, a communication port for serial communication, and effects data communication with the navigation device 10 via the communication port.

The wireless garage door opener transmitter 50 is connected to a switch 52. Moreover, the wireless garage door opener transmitter 50 stores a predetermined vehicle ID in a memory (not shown in the drawings). The vehicle ID is also stored in a wireless garage door opener receiver 54 that is shown in FIG. 2.

The switch 52 is provided with an open button, a close button and an automatic button (each button not shown in the drawings). When the open button is pushed down, an open signal to open the electric garage door 56 shown in FIG. 2 is transmitted and the vehicle ID is changed by the wireless garage door opener transmitter 50 to, for example, a radio wave or an infrared signal. When the open signal and the vehicle ID are received at the wireless garage door opener receiver 54, the received vehicle ID is compared with the stored vehicle ID, and the electric garage door 56 is opened when the two IDs match.

Figure 2:
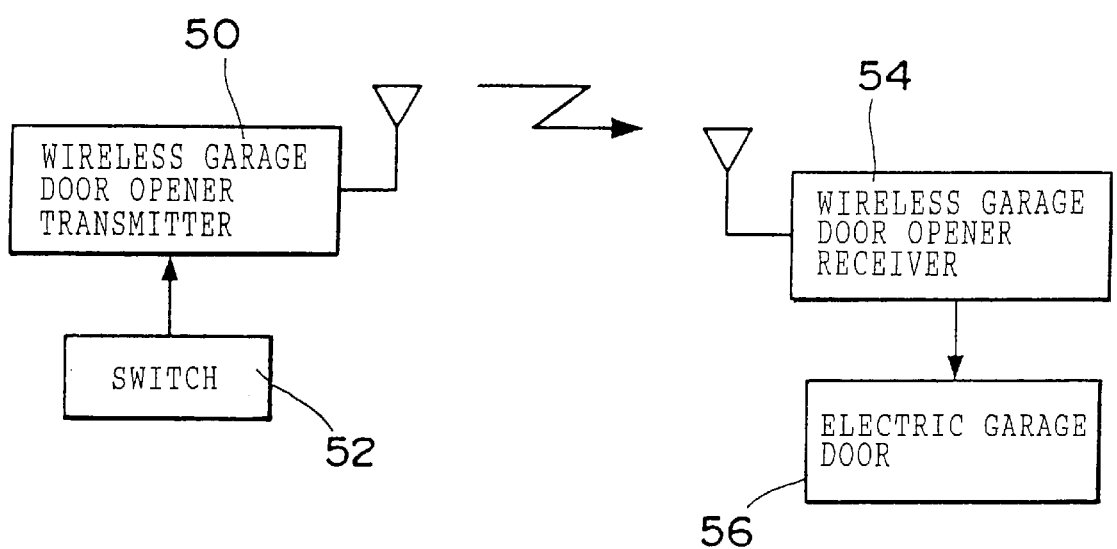
FIG. 2 is a block diagram illustrating a schematic structure of a wireless garage door opener.

Similarly, when the close button is pushed down, a close signal to close the electric garage door 56 shown in FIG. 2 and the vehicle ID are transmitted by the wireless garage door opener transmitter 50. When the close signal and the vehicle ID are received at the wireless garage door opener receiver 54, the received vehicle ID is compared with the stored vehicle ID, and the electric garage door 56 is closed when the two IDs match.

Further, when the automatic button is pushed down, the electric garage door 56 is opened/closed in accordance with the open signal and close signal outputted from the navigation device 10. The navigation device 10 outputs the open signal when the current position and orientation of the vehicle match a pre-registered open instruction position and orientation. The navigation device 10 also outputs the close signal when the current position and orientation of the vehicle match a pre-registered close instruction position and orientation (see below for details).

Next, an operation of the present embodiment will be described.

The open instruction position and orientation that become the conditions for instructing from the garage 64 the opening of the electric garage door 56 when the vehicle 66 is parked in the garage, and setting of the close instruction position and orientation that become the conditions for instructing the closing of the electric garage door 56, will be described with reference to FIG. 3.

Figure 3:
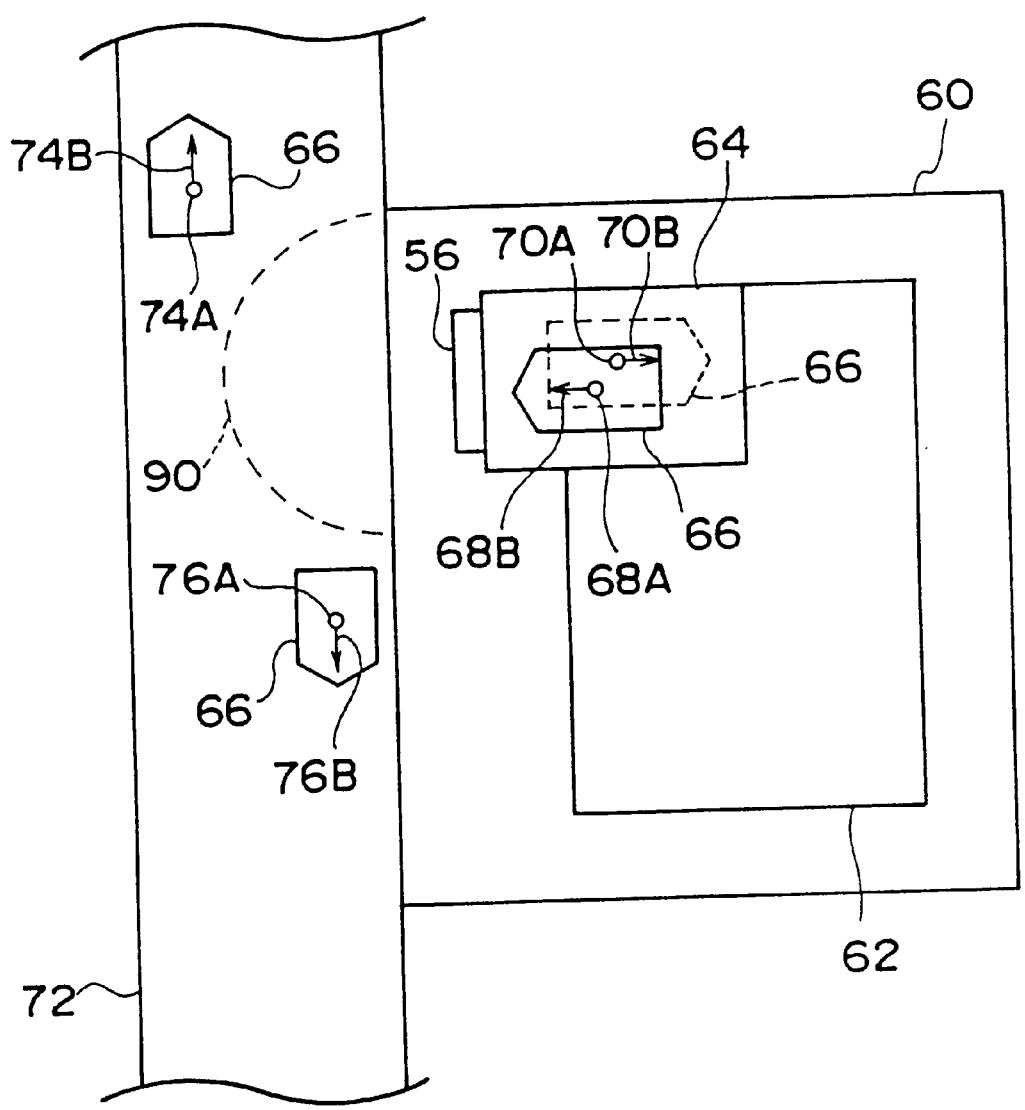
FIG. 3 is a diagram for describing an opening instruction position and orientation and a closing instruction position and orientation at the time a vehicle leaves a garage.

With regard to the open instruction position and orientation, as shown for example in FIG. 3, a position at the time a vehicle 66 (the pointed tip is the front of the vehicle) is parked in the garage 64 disposed adjacent to a house 62 on a plot 60 of land is set as an open instruction position 68A, and the orientation of the vehicle 66 at the open instruction position 68A, i.e., the orientation (indicated in FIG. 3 by the arrow pointed to the left), is set as an open instruction position 68B. The open instruction position 68A and the open instruction position 68B are stored on the PC card 46.

It should be noted that a plurality of open instruction position positions and open instruction orientations may be set. As shown in FIG. 3, an open instruction position 70A and an open instruction orientation 70B may also be set, giving consideration to a case in which the vehicle 66 is parked facing forward.

With regard to the close instruction position and orientation, as shown for example in FIG. 3, a position at the time a vehicle 66 exits the garage 64 onto the road 72 in front of the plot 60 of land to turn right is set as a close instruction position 74A, and the orientation of the vehicle 66 at the close instruction 74B is set as a close instruction orientation 68B. The close instruction position 74A and the close instruction 74B are stored on the PC card 46.

It should be noted that a plurality of close instruction position positions and close instruction orientations may be set. As shown in FIG. 3, a close instruction position 76A and a close instruction orientation 76B may also be set, giving consideration to a case in which the vehicle 66 exits onto the road 72 to turn left.

Next, the open instruction position and orientation that become the conditions for instructing the opening of the electric garage door 56 when the vehicle 66 enters the garage 64, and setting of the close instruction position and orientation that become the conditions for instructing the closing of the electric garage door 56, will be described with reference to FIG. 4.

Figure 4:
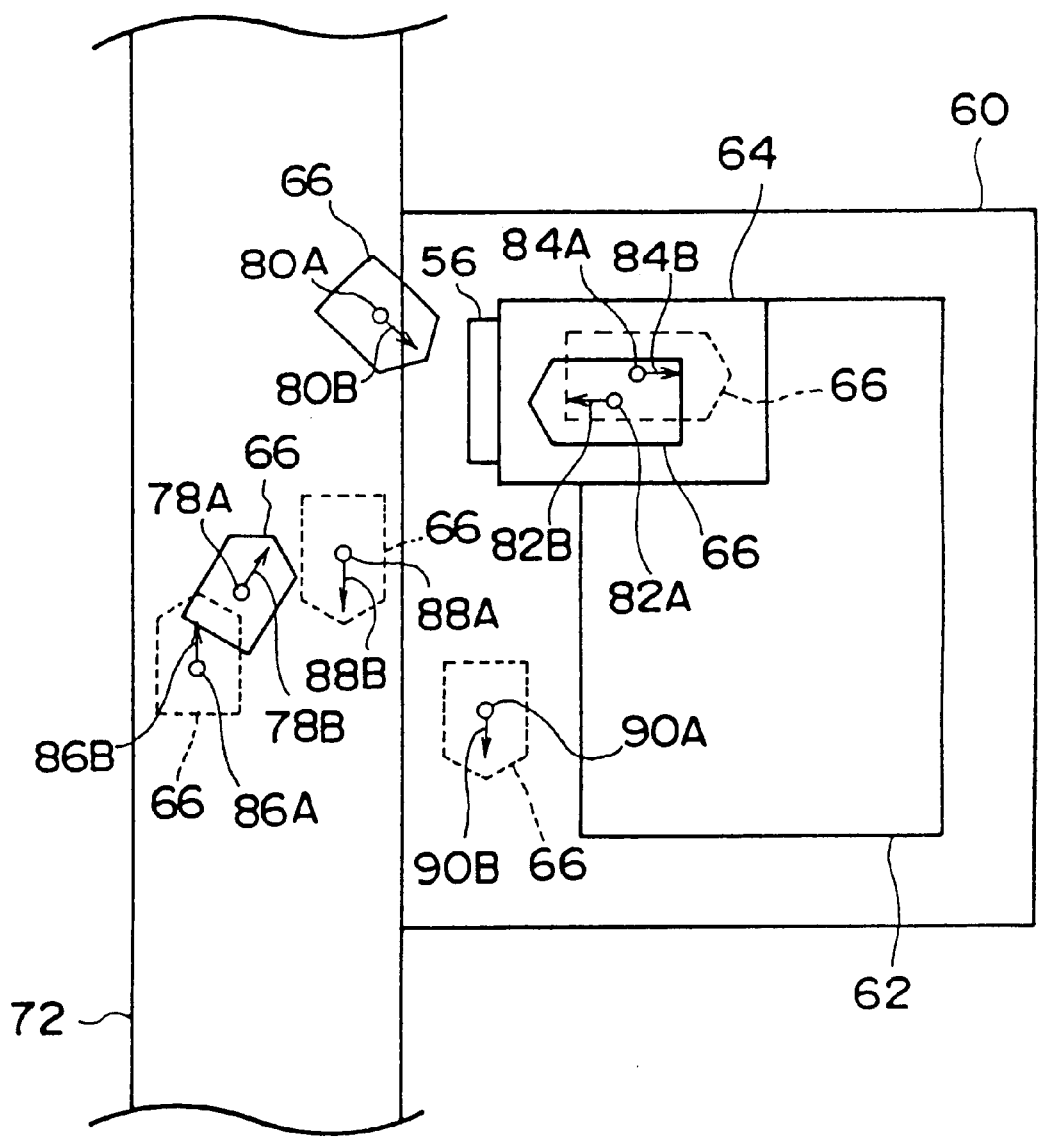
FIG. 4 is a diagram for describing an opening instruction position and orientation at the time the vehicle enters the garage.

With regard to the open instruction position and orientation, as shown for example in FIG. 4, a position at the time the vehicle 66 turns a right to enter the garage 64 is set as an open instruction position 78A, and the orientation of the vehicle 66 at the open instruction position 78A is set as an open instruction orientation 78B. The open instruction position 78A and the open instruction orientation 78B are stored on the PC card 46.

It should be noted that a plurality of open instruction positions and open instruction orientations may be set. As shown in FIG. 4, an open instruction position 80A and an open instruction orientation 80B may also be set, giving consideration to a case in which the vehicle 66 turns left to enter the garage 64.

With regard to the close instruction position and orientation, as shown for example in FIG. 4, a position at the time the vehicle 66 has entered the garage 64 is set as a close instruction position 82A, and the orientation of the vehicle 66 at the close instruction position 82A is set as a close instruction orientation 82B. The close instruction position 82A and the close instruction orientation 82B are stored on the PC card 46.

It should be noted that a plurality of close instruction positions and close instruction orientations may be set. As shown in FIG. 4, a close instruction position 84A and a close instruction orientation 84B may also be set, giving consideration to a case in which the vehicle 66 enters the garage 64 front forward.

Next, control executed in the CPU 12 will be described with reference to the flow chart shown in FIG. 5. It should be noted that the control is effective when the automatic button of the switch 52 is pushed down.

In step 100 shown in FIG. 5, whether or not the current position of the vehicle 66 calculated by the GPS receiver 24 and the orientation of the vehicle 66 detected by the gyro sensor 40 respectively match the open instruction position 78A and the open instruction orientation 78B or the open instruction position 80A and the open instruction orientation 80B when the vehicle 66 enters the garage 64 is determined.

When the current position and orientation of the vehicle 66 respectively match the open instruction position 78A and the open instruction orientation 78B or the open instruction position 80A and the open instruction orientation 80B when the vehicle 66 enters the garage 64, affirmation is made in step 100, and whether or not the speed of the vehicle 66 is equal to or less than a predetermined value (e.g., 5 km/h) is determined in step 101. Namely, when the speed of the vehicle 66 is not equal to or less than the predetermined value, a negation is made in step 101 and the process returns to step 100. When the speed of the vehicle 66 is no greater than the predetermined value, an affirmation is made in step 101, and an open signal is transmitted to the wireless garage door opener transmitter 50 in step 102. Accordingly, the wireless garage door opener transmitter 50 outputs the open signal and the pre-stored vehicle ID.

When the open signal and the vehicle ID are received at the wireless garage door opener receiver 54, the received vehicle ID is compared with the vehicle ID already stored internally, and the electric garage door 56 is opened when the two match.

In this manner, not only the current position of the vehicle 66 but whether or not the current position and also the orientation of the vehicle 66 each substantially match is determined, whether or not the vehicle 66 is stopped is determined, and the open signal to open the electric garage door 56 is outputted. Thus, as shown in FIG. 4, erroneous opening of the electric garage door 56 can be prevented when, for example, the position of the vehicle 66 has merely passed the vehicle positions 86A and 88A or when the vehicle is parked at vehicle position 90A.

Further, because the electric garage door 56 is opened after a match on the vehicle IDs has been confirmed, erroneous opening of the electric garage door 56 can be prevented even in a case in which the open signal and vehicle ID are transmitted from another vehicle.

When the current position and orientation of the vehicle 66 respectively do not match the open instruction position 78A and the open instruction orientation 78B or the open instruction position 80A and the open instruction orientation 80B when the vehicle 66 enters the garage 64, negation is made in step 100, and in step 104 it is determined whether or not the current position and orientation of the vehicle 66 respectively match the close instruction position 82A and the close instruction orientation 82B or the close instruction position 84A and the close instruction orientation 84B when the vehicle 66 enters the garage 64.

When the current position and orientation of the vehicle 66 respectively match the close instruction position 82A and the close instruction orientation 82B or the close instruction position 84A and the close instruction orientation 84B when the vehicle 66 enters the garage 64, affirmation is made in step 104, and in step 106 it is determined whether or not the IG signal 42 has been turned from on to off, i.e., whether or not an engine (not shown) has been shut off.

When the IG signal 42 has not been turned from on to off, negation is made in step 106 and the process returns to step 100. When the IG signal has been turned from on to off, affirmation is made in step 106 and in step 108 the close signal is transmitted to the wireless garage door opener transmitter 50. Accordingly, the wireless garage door opener transmitter 50 outputs the close signal and the pre-stored vehicle ID.

When the close signal and the vehicle ID are received at the wireless garage door opener receiver 54, the received vehicle ID is compared with the vehicle ID already stored internally, and the electric garage door 56 is closed when the two match.

When the current position and orientation of the vehicle 66 respectively do not match the close instruction position 80A and the close instruction orientation 80B or the close instruction position 84A and the close instruction orientation 84B when the vehicle 66 enters the garage 64, negation is made in step 104, and in step 110 it is determined whether or not the current position and orientation of the vehicle 66 respectively match the open instruction position 68A and the open instruction orientation 68B or the open instruction position 70A and the open instruction orientation 70B when the vehicle 66 exits the garage 64.

When the current position and orientation of the vehicle 66 respectively match the open instruction position 68A and the open instruction orientation 68B or the open instruction position 70A and the open instruction orientation 70B when the vehicle 66 exits the garage 64, affirmation is made in step 110, and in step 112 it is determined whether or not the IG signal 42 has been turned from off to on, i.e., whether or not the engine (not shown) has been started.

When the IG signal 42 has not been turned from off to on, negation is made in step 112 and the process returns to step 100. When the IG signal 42 has been turned from off to on, affirmation is made in step 112 and in step 114 the open signal is transmitted to the wireless garage door opener transmitter 50. Accordingly, the wireless garage door opener transmitter 50 outputs the open signal and the pre-stored vehicle ID.

When the open signal and the vehicle ID are received at the wireless garage door opener receiver 54, the received vehicle ID and the vehicle ID already stored internally are compared, and the electric garage door 56 is opened when the two match.

When the current position and orientation of the vehicle 66 respectively do not match the open instruction position 68A and the open instruction orientation 68B or the open instruction position 70A and the close instruction orientation 70B when the vehicle 66 enters the garage 64, negation is made in step 110, and in step 116 it is determined whether or not the current position and orientation of the vehicle 66 respectively match the close instruction position 74A and the close instruction orientation 74B or the close instruction position 76A and the close instruction orientation 76B when the vehicle 66 exits the garage 64.

When the current position and orientation of the vehicle 66 respectively match the close instruction position 74A and the close instruction orientation 74B or the close instruction position 76A and the close instruction orientation 76B when the vehicle 66 exits the garage 64, affirmation is made in step 116, and in step 118 the close signal is transmitted to the wireless garage door opener transmitter 50. Accordingly, the wireless garage door opener transmitter 50 outputs the close signal and the pre-stored vehicle ID When the close signal and the vehicle ID are received at the wireless garage door opener receiver 54, the received vehicle ID is compared with the vehicle ID already stored internally, and the electric garage door 56 is closed when the two match.

When the current position and orientation of the vehicle 66 respectively do not match the close instruction position 74A and the close instruction orientation 74B or the close instruction position 76A and the close instruction orientation 76B when the vehicle 66 exits the garage 64, negation is made in step 116, and in step 120 it is determined whether or not a predetermined distance has been run after the vehicle 66 has exited the garage 64 (e.g., whether or not the semicircle that has the electric garage door 56 as a center and is illustrated in FIG. 3 by a dotted line has been crossed, or whether or not a predetermined amount of time has elapsed since the vehicle 66 left the garage 64).

When the predetermined distance has not been run after the vehicle 66 has exited the garage 64 and the predetermined amount or time has not elapsed, negation is made in step 120, and the process returns to step 100. When the predetermined distance has been run after the vehicle 66 has exited the garage 64 and the predetermined amount has expired, affirmation is made in step 120, and in step 118 the close signal is transmitted to the wireless garage door opener transmitter 50. For this reason, the electric garage door 56 can automatically and reliably closed, even in a case in which the current position and orientation of the vehicle 66 do not respectively match the close instruction position and close orientation position when the vehicle 66 exits the garage 64.

It should be noted that, in step 110, although it is determined whether or not the current position and orientation of the vehicle 66 respectively match the open instruction position 68A and the open instruction orientation 68B or the open instruction position 70A and the open instruction orientation 70B when the vehicle 66 exits the garage 64, it is also possible to store on the PC card 46 the position and orientation of the vehicle 66 when the IG signal has been turned from on to off, so that it is determined whether or not the stored position and stored orientation of the vehicle 66 respectively match the open instruction position 68A and the open instruction orientation 68B or the open instruction position 70A and the open instruction orientation 70B when the vehicle 66 exits the garage 64.

As described above, not only the current position of the vehicle 66 but whether or not the open instruction position and orientation of the vehicle 66 each substantially match is determined, whether or not the vehicle 66 is stationary is determined, and the open signal to open the electric garage door 56 is outputted. Thus, erroneous opening of the electric garage door 56 can be prevented when the vehicle 66 approaches the electric garage door 56 with an object other than entering the garage 64.

Further, since it is unnecessary to provide a special device such as a beacon on the vehicle, software can be added to the navigation device and existing wireless garage door openers can be connected thereto, the navigation device can be structured inexpensively.

It should be noted that, in the present embodiment, determination of the opening or closing of the garage door 64 and transmission of the open signal or close signal are carried out by the navigation device 10. However, these may also be carried out by the wireless garage door opener transmitter 50. In addition, a plurality of determination information (e.g., vehicular position, orientation, IG signal, vehicular speed, etc.) may be transmitted to the wireless garage door opener transmitter 50 when the vehicle is in a predetermined range (registered garage perimeter). Accordingly, the risk of conflict can be reduced when garage door openers are jointly used by a plurality of vehicles.

As described above, in accordance with the invention of the first aspect, an open signal for opening the electric garage door is outputted when the current position and orientation of the vehicle respectively match a predetermined open position and open orientation outside of the electric garage and the speed of the vehicle is no greater than a predetermined speed. Thus, there is the effect that erroneous opening of the electric garage door when the vehicle has merely passed in front of the electric garage or the like, or when the vehicle approaches the electric garage with a purpose other than entering the electric garage, can be prevented.

What is claimed is:

1. A navigation device to which a remote control device for remotely opening/closing an electric garage door can be connected, the navigation device comprising:

a current position detection means for detecting a current position of a vehicle;

an orientation detection means for detecting a travelling direction of the vehicle;

a speed detection means for detecting a speed of the vehicle; and a means for recording in advance a combination of a position and a travelling direction for opening the door, and an output means for outputting to the remote control device an open signal for opening the electric garage door when the detected current position is within a predetermined range including a predetermined open position outside of an electric garage, the detected travelling direction is within a predetermined range including a predetermined open orientation, and the speed of the vehicle is no greater than a predetermined speed, wherein the output means outputs to the remote control device a close signal for closing the electric garage door when the vehicle has run a predetermined distance from a predetermined position in the electric garage and when a predetermined amount of time has elapsed after the electric garage door has been opened.

2. The navigation device according to claim 1, wherein the output means outputs to the remote control device a close signal for closing the electric garage door when the detected current position is within a predetermined range including a predetermined close position inside the electric garage, the detected travelling direction is within a predetermined range including a predetermined close orientation, and an engine of the vehicle has moved from an operating state to a stopped state.

3. The navigation device according to claim 1, wherein the output means outputs to the remote control device said open signal for opening the electric garage door when the detected current position is within said predetermined range including said predetermined open orientation inside the electric garage, said detected travelling direction is within a predetermined range including said predetermined open position, and an engine of the vehicle has moved from a stopped state to an operating state.

4. The navigation device according to claim 1, wherein the output means outputs to the remote control device a close signal for closing the electric garage door when the detected current position is within a predetermined range including a predetermined close position outside of the electric garage and the detected travelling direction is within a predetermined range including a predetermined close orientation.

5. The navigation device according to claim 1, wherein the output means outputs to the remote control device a close signal for closing the electric garage door when the vehicle has run a predetermined distance from a predetermined position in the electric garage or when a predetermined amount of time has elapsed after the electric garage door has been opened.

6. The navigation device according to claim 1, wherein the remote control device is a wireless door opener transmitter.

7. A navigation device to which a remote control device for remotely opening/closing an electric garage door can be connected, the navigation device comprising:
- a current position detection means for detecting a current position of a vehicle;
- an orientation detection means for detecting a travelling direction of the vehicle;
- a speed detection means for detecting a speed of the vehicle; and
- a means for recording in advance a combination of a position and a travelling direction for opening the door, and
- an output means for outputting to the remote control device an open signal for opening the electric garage door when the detected current position is within a predetermined range including a predetermined open position outside of an electric garage, the detected travelling direction is within a predetermined range including a predetermined open orientation, and the speed of the vehicle is no greater than a predetermined speed, and
- wherein the output means outputs to the remote control device a close signal for closing the electric garage door when the detected current position is within a predetermined range including a predetermined close position inside an electric garage, the detected travelling direction is within a predetermined range including a predetermined close orientation, and an engine of the vehicle has moved from an operating state to a stopped state, and
- wherein in the electric garage, a position and orientation at which the engine. of the vehicle has moved from said operating state to said stopped state become an electric garage door open position and open orientation when exiting the electric garage next time.

8. A navigation device to which a remote control device for remotely opening/closing an electric garage door can be connected, comprising:
- a current position detection means for detecting a current position of a vehicle;
- an orientation detection means for detecting a travelling direction of the vehicle;
- a speed detection means for detecting a speed of the vehicle;
- a means for recording in advance a plurality of combinations of a position and a travelling direction for opening the door, and
- an output means for outputting to the remote control device an open signal for opening a single electric garage door when one of said plurality of predetermined combinations open positions and open orientations outside of an electric garage is achieved, such that the detected current position is within a predetermined range including any of the open positions of the plurality of predetermined open positions of the set, the detected travelling direction is within a predetermined range including an open position belonging to the same set of open orientations, and the speed of the vehicle is no greater than a predetermined speed.

9. The navigation device of claim 8, wherein a set of a plurality of close positions and close orientations inside of the electric garage is predetermined and the output means outputs to the remote control device a close signal for closing the electric garage door when the detected current position is within a predetermined range including any of the closed positions of the plurality of the set of predetermined close positions, the detected travelling direction is within a predetermined range including a close travelling direction belonging to the same set of predetermined close orientations, and an engine of the vehicle has moved from an operating state to a stopped state.

10. The navigation device according to claim 8, wherein said set of a plurality of open positions and open travelling directions inside of the electric garage is predetermined and the output means outputs to the remote control device an open signal for opening the electric garage door when the detected current position is within a predetermined range including any of the open positions of the plurality of the set of open positions, the detected orientation is within a predetermined range including an open orientation belonging to the set of open orientations, and an engine of the vehicle has moved from a stopped state to an operating state.

11. The navigation device according to claim 8, wherein said set of a plurality of close positions and close orientations outside of the electric garage is predetermined and the output means outputs to the remote control device a close signal for closing the electric garage door when the detected current position is within a predetermined range including any of the close positions of the set of close positions and the detected travelling direction is within a predetermined range including a close orientation belonging to the set of close orientations.

12. A method of opening/closing an electric garage door, in a navigation device to which a remote control device for remotely opening/closing the electric garage door can be connected, the method comprising:
- detecting a current position of a vehicle;
- detecting a travelling direction of the vehicle;
- detecting a speed of the vehicle;
- setting in advance a plurality of combinations of a position and a travelling direction for opening the door in advance;
- a first determining step in which it is determined whether or not the detected current position is within a predetermined range within one of said combinations including a predetermined open position outside of an electric garage and whether or not the detected orientation is within a predetermined range including a predetermined open orientation;
- a second determining step for determining whether or not the speed of the vehicle is no greater than a predetermined speed; and
- a step of outputting to the remote control device an open signal for opening a single electric garage door when, in the first determining step, the detected current position is determined to be within a predetermined range within one of said combinations including a predetermined open position outside of the electric garage and the detected travelling direction is determined to be within a predetermined range within one of said combinations including a predetermined open orientation and, in the second determining step, the speed of the vehicle is determined to be no greater than the predetermined speed.

13. The method of opening/closing an electric garage door according to claim 12, wherein:
- in the first determining step, it is determined whether or not the detected current position is within a predetermined range including a predetermined close position inside of the electric garage and the detected orientation is within a predetermined range including a predetermined close position; and in the second determining step, it is determined whether or not an engine of the vehicle has moved from an operating state to a stopped state; and the method further comprises a step of outputting to the remote control device a close signal for closing the electric garage door when, in the first determining step, the detected current position is determined to be within a predetermined range including a predetermined close position inside of the electric garage and the detected travelling direction is determined to be within a predetermined range including a predetermined close orientation and, in the second determining step, the engine of the vehicle is determined to have moved from an operating state to a stopped state.

14. The method for opening/closing an electric garage door according to claim 12, wherein:

in the first determining step, it is determined whether or not the detected current position is within a predetermined range including a predetermined open position inside of the electric garage and the detected travelling direction is within a predetermined range including a predetermined open position; and in the second determining step, it is determined whether or not an engine of the vehicle has moved from a stopped state to an operating state; and the method further comprises a step of outputting to the remote control device said open signal for opening the electric garage door when, in the first determining step, the detected current position is determined to be within a predetermined range including a predetermined open position inside of the electric garage and the detected travelling direction is determined to be within a predetermined range including a predetermined open orientation and, in the second determining step, the engine of the vehicle is determined to have moved from a stopped state to an operating state.

15. The method of opening/closing an electric garage door according to claim 12 wherein, in the first determining step, it is determined whether or not the detected current position is within a predetermined range including a predetermined close position outside of the electric garage and whether or not the travelling direction is within a predetermined range including a predetermined close orientation, and the method further comprises a step of outputting to the remote control device a close signal for closing the electric garage door when, in the first determining step, the detected current position is determined to be within a predetermined range including a predetermined close position outside of the electric garage and the detected travelling direction is determined to be within a predetermined range including a predetermined close orientation.

16. The method of opening/closing an electric garage door according to claim 12, further comprising:

a first step in which it is determined whether or not the vehicle has run a predetermined distance from a predetermined position in the electric garage;

a second step in which it is determined whether or not a predetermined amount of time has elapsed after the electric garage door has been opened; and a step of outputting to the remote control device a close signal for closing the electric garage door when, in the first step, it is determined whether said predetermined distance from said predetermined position in the electric garage has been run and, in the second step, it is determined that said predetermined amount of time has elapsed after the electric garage door has been opened.

17. A navigation device to which a remote control device for remotely opening/closing an electric garage door can be connected the navigation device comprising:

a current position detection means for detecting a current position of a vehicle;

an orientation detection means for detecting a travelling direction of the vehicle;

a speed detection means for detecting a speed of the vehicle;

an output means for outputting to the remote control device;

an open signal for opening the electric garage door when the detected current position is within a predetermined range including a predetermined open position outside of an electric garage, the detected travelling direction is within a predetermined range including a predetermined open orientation, and the speed of the vehicle is no greater than a predetermined speed, and a close signal for closing the electric garage door upon a determination of whether a predetermined distance from a predetermined position in the electric garage has been run, and after a predetermined amount of time has elapsed after the electric garage door has been opened.

18. A navigation device to which a remote control device for remotely opening/closing an electric garage door can be connected, the navigation device comprising:

a current position detection means for detecting a current position of a vehicle;

an orientation detection means for detecting a travelling direction of the vehicle;

a speed detection means for detecting a speed of the vehicle, an output means for outputting to the remote control device;

an open signal for opening the electric garage door when a set of a plurality of predetermined open positions and open orientations outside of an electric garage is achieved, the detected current position is within a predetermined range including any of the open positions of the plurality of open orientations of the set, the detected travelling direction is within a predetermined range including an open orientation of the plurality of open orientations of the set, and the speed of the vehicle is no greater than a predetermined speed that corresponds to a speed in an almost stopped state, and a close signal for closing the electric garage door upon a determination of whether a predetermined distance from a predetermined position in the electric garage has been run, and after a predetermined amount of time has elapsed after the electric garage door has been opened.

* * * * *